US007933693B2

(12) United States Patent
Rosenberg et al.

(10) Patent No.: US 7,933,693 B2
(45) Date of Patent: Apr. 26, 2011

(54) SYSTEM AND METHOD FOR HARVESTING BUSINESS INTELLIGENCE FROM MARITIME COMMUNICATIONS

(75) Inventors: Dean Rosenberg, San Diego, CA (US); Kevin Crawford, San Diego, CA (US); Kiel Stock, San Diego, CA (US)

(73) Assignee: Airsis, Inc., San Diego, CA (US)

( * ) Notice: Subject to any disclaimer, the term of this patent is extended or adjusted under 35 U.S.C. 154(b) by 0 days.

(21) Appl. No.: 12/105,877

(22) Filed: Apr. 18, 2008

(65) Prior Publication Data

US 2008/0258960 A1 Oct. 23, 2008

Related U.S. Application Data

(60) Provisional application No. 60/913,193, filed on Apr. 20, 2007.

(51) Int. Cl.
*G05D 3/00* (2006.01)

(52) U.S. Cl. ............................ 701/21; 701/24; 701/120

(58) Field of Classification Search .............. 342/41-51; 701/21, 24, 120

See application file for complete search history.

(56) References Cited

U.S. PATENT DOCUMENTS

| | | | | |
|---|---|---|---|---|
| 4,893,127 | A * | 1/1990 | Clark et al. | 342/386 |
| 6,249,241 | B1 * | 6/2001 | Jordan et al. | 342/41 |
| 2002/0052772 | A1 * | 5/2002 | Nishimoto et al. | 705/8 |
| 2003/0028294 | A1 * | 2/2003 | Yanagi | 701/21 |
| 2004/0030496 | A1 * | 2/2004 | Brodie | 701/213 |
| 2005/0149453 | A1 * | 7/2005 | Amling et al. | 705/60 |
| 2005/0250440 | A1 * | 11/2005 | Zhou et al. | 455/12.1 |
| 2007/0076668 | A1 * | 4/2007 | Tirkkonen et al. | 370/335 |

FOREIGN PATENT DOCUMENTS

| | | |
|---|---|---|
| JP | 2001281331 | 10/2001 |
| JP | 2005182539 | 7/2005 |
| KR | 1020060087360 | 8/2006 |

OTHER PUBLICATIONS

US Coast Guard, Universal Shipborne Automatic Identification System (AIS) Transponder, http://web.archive.org/web/20030128214335/http://www.gpc.se/aisusa/uscgais.htm (accessed Jan. 12, 2005).*

Maritime Exchange, Ship Reporting, http://web.archive.org/web/20060426210303/http://www.maritimedelriv.com/Ops/ship_reporting.htm (accessed Apr. 26, 2006).*

International Search Report and Written Opinion from PCT/US2008/060927 dated Mar. 31, 2009.

* cited by examiner

*Primary Examiner* — Thomas H Tarcza
*Assistant Examiner* — Timothy A Brainard
(74) *Attorney, Agent, or Firm* — Procopio, Cory, Hargreaves & Savitch LLP

(57) ABSTRACT

A system for harvesting business intelligence from maritime communications uses AIS signals as the source of information regarding the position and heading of vessels. The system builds and maintains a data base of location information of vessels within one or more defined geographic areas over time. The system further includes definitions of points of interest and can use the information from the AIS signals to identify and store events associated with the points of information.

20 Claims, 11 Drawing Sheets

SYSTEM AND METHOD FOR HARVESTING BUSINESS INTELLIGENCE FROM MARITIME COMMUNICATIONS

RELATED APPLICATIONS

This application claims the benefit of provisional patent application Ser. No. 60/913,193, filed Apr. 20, 2007, titled SYSTEM AND METHOD FOR HARVESTING BUSINESS INTELLIGENCE FROM MARITIME COMMUNICATIONS, which is hereby incorporated by reference.

BACKGROUND

1. Field of the Invention

The present invention relates generally to the processing of maritime communications.

2. Related Art

Automatic Identification System ("AIS") is a system that ships and vessel traffic use, primarily for identification at sea to avoid collisions. Various laws require that certain vessels announce their identity, position and heading on a periodic basis using an on-board AIS transponder. The U.S. Coast Guard requires that vessels not only transmit AIS signals at sea, but also while they are transiting maritime ports and waterways.

SUMMARY

Embodiments described herein provide for a system and method for harvesting business intelligence from maritime communications and information. In one aspect, a method and system builds a data storage system based on location and/or heading information of vessels within one or more defined geographic areas over time. In one embodiment, AIS signals are used as the source of the information. Using the method and system, AIS signals are received from vessels over time, and information derived from those signals is stored in a data base system. The method and system further includes definitions of, for example, points of interest (POI), and can use the information derived from the AIS signals to identify and store events associated with the POI.

In another aspect, a method and system improve maritime communication and knowledge. For example, the method and system can provide a user with information about events associated with the POI or the vessels, including the time of arrival and departure of a vessel from a POI or the passing of a vessel by the POI. The system and method can also provide the user with information when a certain vessel is alongside another vessel (for example when a pilot boat or tug boat is alongside another vessel to provide assistance).

In another aspect, a reporting module uses the data storage system for historic aggregate reporting, which provides users with tools to enhance efficiency, reduce delay, and improve safety and security at maritime ports.

In one aspect a computerized system for harvesting business intelligence from maritime communications from vessels includes a data storage system, a processing module, which receives automated identification system (AIS) signals from a plurality of vessels; an inbound message queue, which receives the AIS signals from the processing module and stores them in the data storage system; a parsing module, which processes the AIS signal to divide each AIS signal into a plurality of AIS component data including vessel identifying information and location information and stores them in the data storage system; and a points of interest (POI) module, which stores data defining points of interest in the data storage system and includes a state machine, which derives event information about a vessel and points of interest using the data defining the points of interest and the AIS component data and updates the data storage system with the event information.

In a further aspect the system also includes an input/output module configured to receive input from a user and to access the data storage system and display output to the user based on data in the data storage system and the input.

In a further aspect the state machine determines when a vessel departs from a point of interest and when a vessel arrives at a point of interest. The system can also include a day/night conversion module configured to determine whether an arrival or a departure occurred during the day or during the night. Additionally, the system can include a searching module configured to perform searches of the data in the data storage system.

In another aspect, a method for operating a computerized system for harvesting business intelligence from maritime communications includes receiving first signals from a plurality of vessels which include vessel identifying information and location information; storing the location information in a data storage system with each location information associated with a vessel; deriving event information about the geographic relationship between vessels and points of interest using the vessel location information and data defining points of interest; storing the derived event information in the data storage system; receiving second signals from the plurality of vessels which include vessel identifying information and location information; storing the location information from the second signals in the data storage system with each location information associated with a vessel; deriving event information about the geographic relationship between vessels and points of interest using the vessel location information from the second signals and data defining points of interest. This can create a historical record of the location of the vessels and their geographic relationship over time.

The method can also include determining whether a vessel has entered a perimeter associated with a POI and if so, updating the data storage system to indicate that the vessel has arrived at the POI. Additionally, after it has been determined that the vessel has entered the perimeter associated with the POI, determining whether the speed of the vessel is below a threshold and if it is, updating the data storage system with the time the vessel stopped at the POI.

The method can also include comparing the current position of a vessel to the perimeter associated with a POI at which the vessel previously arrived; and if the vessel is no longer within the perimeter, updating the data storage system to reflect a departure from the POI. In addition, if more than one signal is received from the same vessel within a predetermined time limit then one of the signals is discarded.

Additionally, a vessel can be a POI.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In one aspect, a method and system generate a data store or database of location and/or heading information of vessels within one or more defined geographic areas over time. In one embodiment, AIS signals are captured and analyzed to provide the raw data. AIS and AIS signals are used in this application as examples of signals transmitted from a vessel which identifies a vessel and its location and may provide heading information. Though the following description focuses on an example which uses AIS signals as the primary source of the location and/or heading information for vessels, other sources of such information or other information from which such data can be derived can also be used. For example, other types of vessel identification and location identification systems can also be used.

Figure 1:
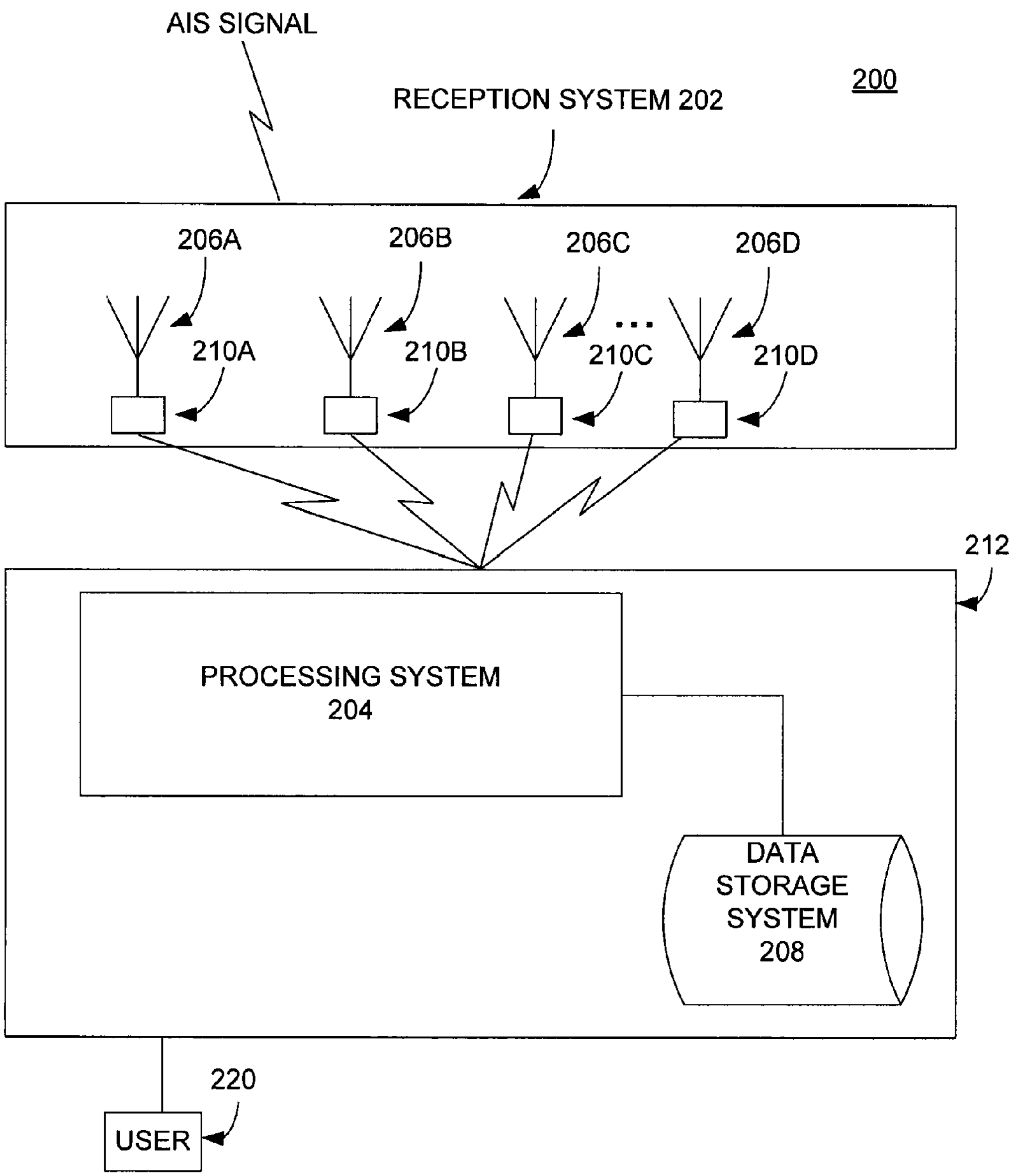
FIG. 1 is a block diagram of a system for harvesting business intelligence from maritime communications according to one embodiment of the invention.

Referring to FIG. 1, vessels transmit AIS signals containing AIS data on one or more predetermined radio frequencies. A reception system 202 uses one or more receivers to receive the AIS signals at one or more locations. In one embodiment the reception system 202 provides reception coverage for one or more ports and surrounding areas or other geographic areas. The receivers include antennas 206 and corresponding receiver systems 210 that are capable of receiving the AIS signals from vessels and forwarding the AIS data in those signals to a system 212 for harvesting business intelligence from maritime communications. The communication link between the reception system 202 and the system 212 for harvesting business intelligence from maritime communications (hereafter referred to as the analysis system 212) can be a wireless link, a wired link or combinations thereof.

The analysis system 212 includes a processing system 204 and a data storage system 208. The processing system 204 receives the AIS data from the reception system 202. In one embodiment the processing system 204 includes one or more servers or general purpose computers that are programmed to process the AIS data and store it in the data storage system.

A user of the analysis system 212 can interact with the system via a computing device or a communication device, for example, device 220. The device can be, for example, a personal computer, mobile telephone or a personal digital assistant. The device 220 can communicate with the analysis system 212 over various networks or combinations of networks, including, for example, the internet, a telecommunications network, or a private network.

Figure 2:
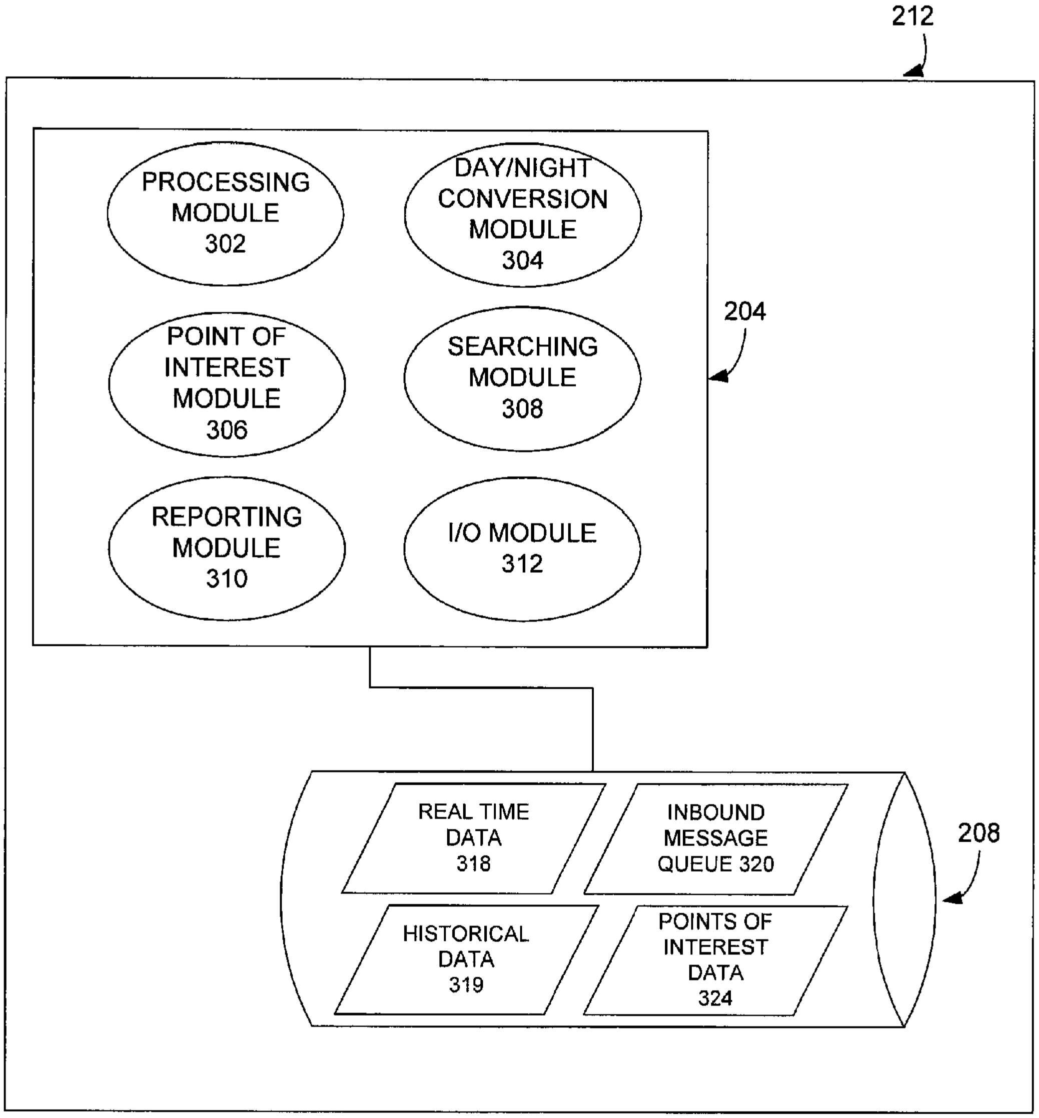
FIG. 2 is a block diagram of a maritime processing and data storage system according to one embodiment of the invention.

Referring now to FIG. 2, additional details of one embodiment of the analysis system 212 will now be described. In one example, the processing system 204 includes a processing module 302, which receives the AIS data from the reception system 202, parses the data, and stores the parsed data in the data storage system. In one embodiment, the processing module 302 receives the AIS data continually. In another embodiment, the processing module 302 receives the AIS data periodically. The processing module 302 may also receive the AIS data from the reception system 202 intermittently.

In one example, the processing module 302 is implemented as multi-threaded software running on one or more servers. The processing module 302 places the AIS data in an inbound message queue 320 of the data storage system 208. The processing module 302 includes a parser, which analyses the AIS data from the inbound message queue 320 and breaks it up into its component parts and stores the component parts as real time data 318 in the data storage system 208. In one embodiment, some of the component parts of the AIS signal include latitude, longitude, vessel identifiers, time stamps, heading, direction of travel, and speed. The real time data 318 is periodically transferred to historical data 319. For example, the real time data 318 can be transferred at predetermined time intervals, when data associated with a vessel changes or both.

The data storage system 208 can include points of interest (POI) data 324. A POI can be, for example, a pier, a buoy, a port, a terminal, or a vessel. Examples of POI data are name and location and geographic attributes of the POI. The POI data can also include data associated with vessel arrivals, departures, and passings for all designated POIs. In one embodiment, each POI has an associated "geo-fence," which is an area around the POI defined, for example, in latitude and longitude. In another embodiment, a POI may have a plurality of associated geo-fences.

A searching module 308 can perform a free form (or formatted) search of the historical data 319 and the real time data 318. In one embodiment, it can differentiate between a number of different identifiers, including for example, IMO ("International Maritime Organization") number, vessel call sign, and vessel name. The searching module 308 can also provide search results that discriminate between POIs, vessels, geographic regions. For example, the results of the search can show real time vessel locations for all vessels near a selected POI. The searching module 308 can also search the data storage system 208 to retrieve results for display, including selected aggregate data, which may incorporate arrivals, time of day, vessel name, vessel type, elapsed time between POI, etc.

A reporting module 310 allows a user to generate reports about vessel arrival and departures at designated POIs or about activity occurring at the POIs. The reporting module 310 can also play back the events, using the historical data 319, for example, in a user interfacedisplayed to a user. The reporting module 310 can also employ filters so that it plays back only information relevant to a user. For example, the user can request playback of an event regarding only a specific POI or only a vessel or a defined group of vessels (a fleet). The reporting module 310 can also be set to provide alerts regarding the arrival of a vessel at a POI, the arrival of a vessel at a port, the departure of a vessel from a POI, the departure of a vessel from a port, the passing of a POI by a vessel, and a service vessel being alongside a vessel, for example. A user can be e-mailed or receive a text message every time an event occurs with respect to a POI, vessel, or fleet.

A day/night conversion module 304 differentiates day from night through analysis of daily times for sunrise and sunset at a location of interest. This allows an analysis to be performed only on day or only on night events as applicable. For example, the day/night conversion module 304 can compare the time of day to the current sunrise/sunset parameters for the calendar date. If it is after sunset and before sunrise, then the day/night conversion module 304 designates a record with "NIGHT". Otherwise, the day/night conversion module 304 designates the record with "DAY". This allows for consistency of daytime versus nighttime reporting, even thought actual time of day associated with day and night changes throughout the seasons.

A POI module 306 uses the POI data 324 and the real time data 318 in the data storage system 208 to derive vessel arrival and departure times with respect to each POI. The information thus generated is stored and associated with the vessel and/or POI.

In one embodiment all user interaction described herein is provided by the input/output (I/O) module 312. In one embodiment, the I/O module 312 provides a graphical user interface to the user, for example, a collection of web pages accessible via a web browser on a personal computer operated by the user. The interface provided by the I/O module 312 allows the user to interact with, receive information and otherwise receive the benefits of the functions of the other modules described herein.

Figure 3:
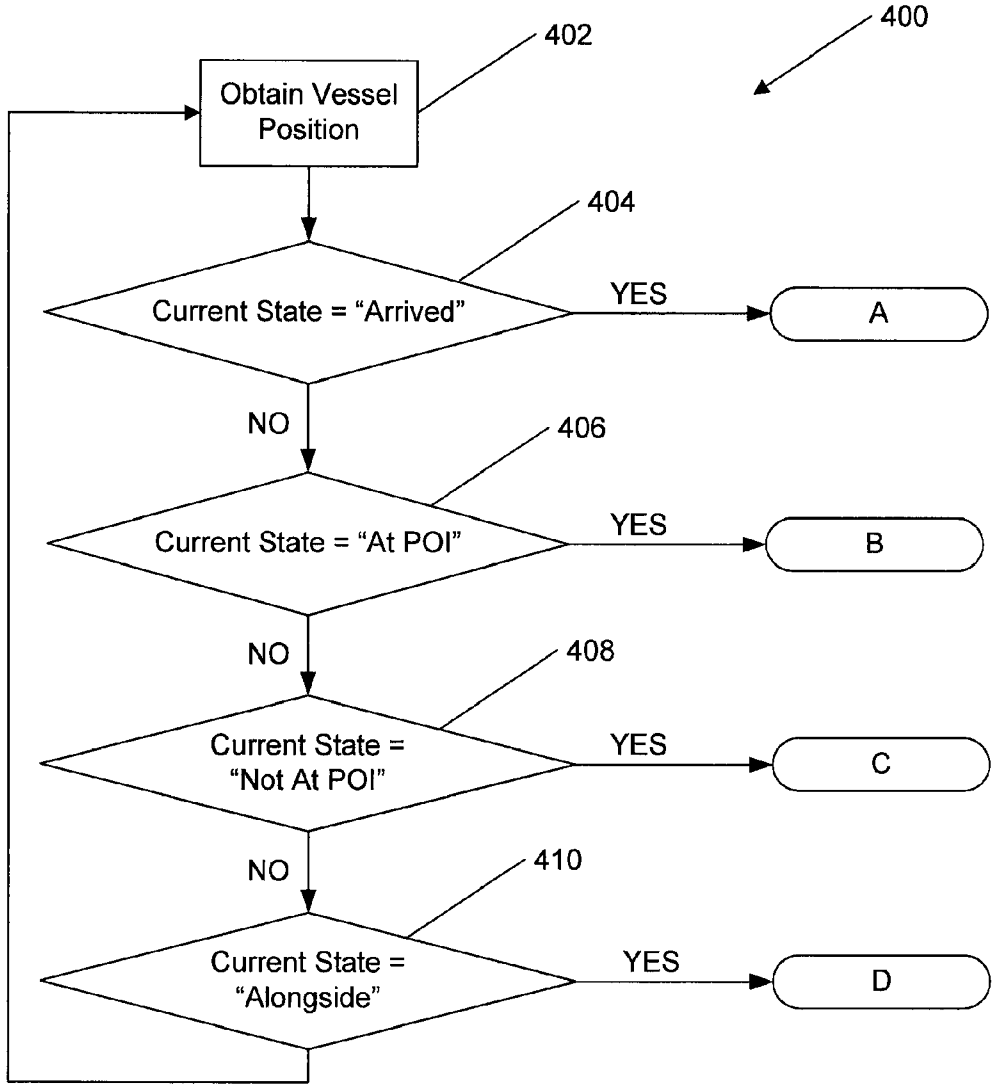
FIG. 3 is a flowchart showing one implementation of a state machine included in a point of interest module according to one embodiment of the invention.

FIG. 3 is a flowchart showing one implementation of a state machine 400 implemented in the point of interest module 306 according to one embodiment of the invention. In one embodiment the state machine represents the geographic relationship between a vessel and a POI. It includes four states based on a determined vessel position and the most recent data associated with the AIS signal from that vessel: "Arrived" (404), "At POI" (406) "Not at POI" (408), and "Alongside" (410). The "Arrived" state occurs when a vessel is stopped within the defined geo-fence of a POI. An example of the "Arrived" state is when the vessel is docked. The "At POI" state occurs when the vessel is within a geo-fence of a particular POI but has, for example, not yet docked or is moving at a speed that exceeds a predetermined threshold. The "Not at POI" state occurs when a vessel is not within any geo-fence of any POI. The "Alongside" state occurs when the vessel is less than a predetermined threshold distance from another vessel.

Referring to FIG. 3, at step 402 the vessel's most recent position is obtained. In one example, the AIS signal provides vessel locations (and related data) over the air on a real-time basis. The reception system 202 listens for the AIS signal and the processing module 302 extracts and records data in the AIS signal as real time data. The POI module 306 may retrieve the vessel position from the real time data on a periodic basis or it can be triggered by a change in the location of the vessel. At step 404, the POI module 306 determines whether the vessel's current state (stored in the POI data 324) is "Arrived." If the vessel is in the "Arrived" state the process continues as shown by the state machine 500 in FIG. 4.

Figure 4:
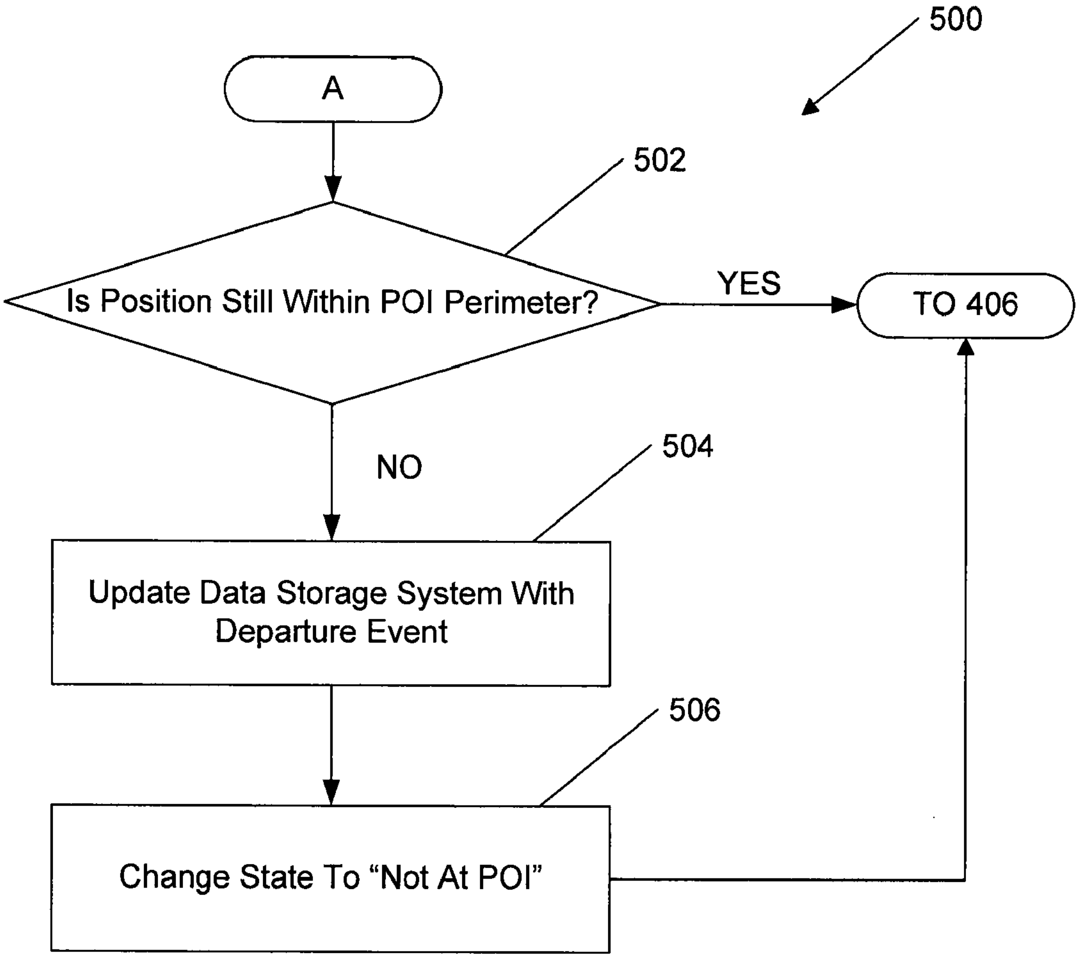
FIG. 4 is a flowchart showing one implementation of a state machine included in a point of interest module according to one embodiment of the invention.
Figure 5:
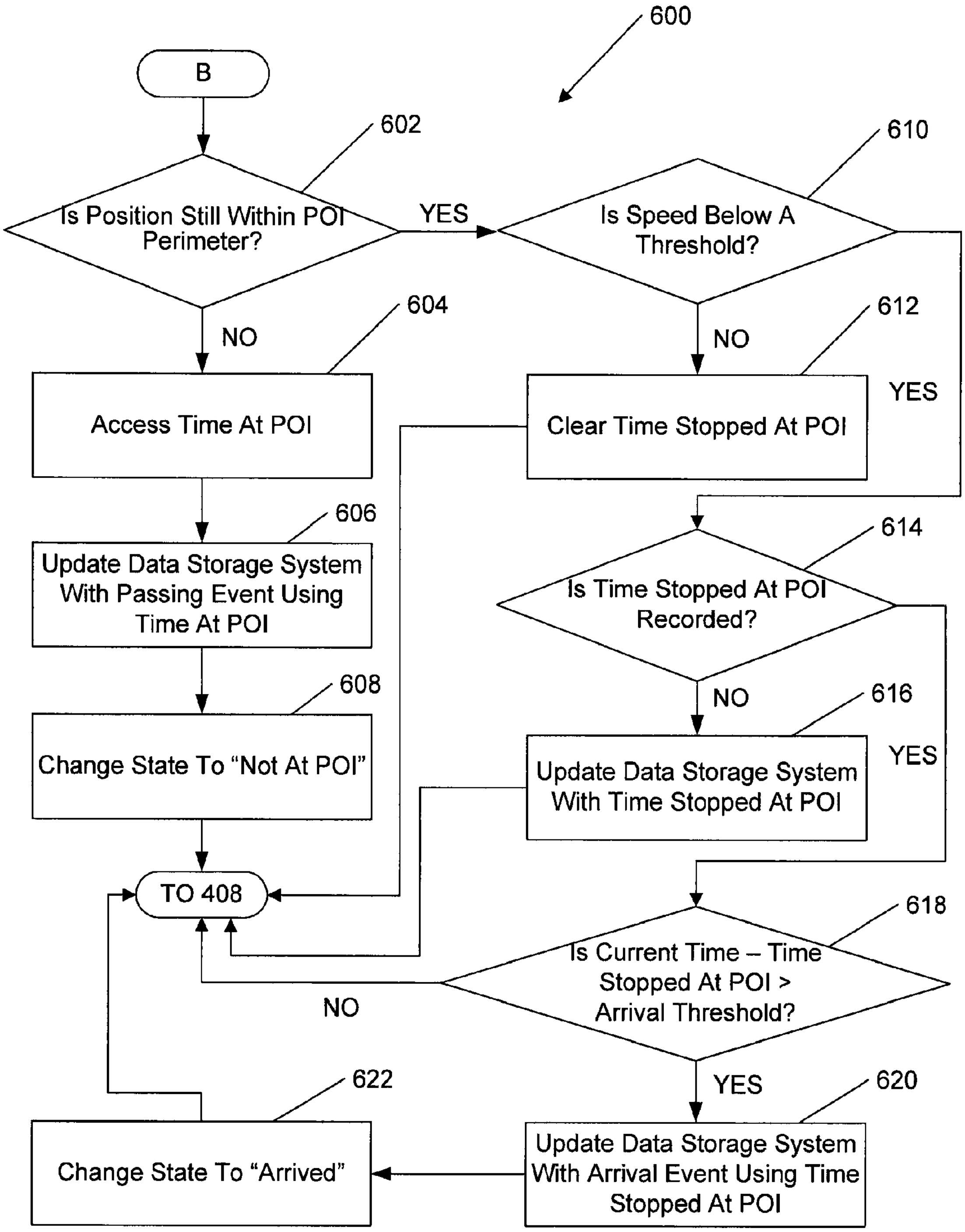
FIG. 5 is a flowchart showing one implementation of a state machine included in a point of interest module according to one embodiment of the invention.

FIG. 4 is a flowchart showing one implementation of a state machine 500 included in a point of interest module 306 according to one embodiment of the invention. In FIG. 4, the POI module 306 determines whether the vessel is still within a POI perimeter. The determination as to whether the vessel is still within a POI perimeter includes comparing the current position of the vessel to a geo-fence of the POI at which the vessel previously arrived. In one embodiment, the POI module 306 makes the determination each time new data associated with the AIS signal is received, but only if the vessel is already in the arrived state. If the vessel is no longer within the POI perimeter, the processing module 302 updates the POI data 324 and the process proceeds to step 406 of FIG. 3. Updating the POI data includes creating a "departure" event for the current vessel. A departure event can be stored in the data storage system 208 as POI data 324, historical data 319, or both. FIG. 5 is a flowchart showing one implementation of a state machine included in a point of interest module according to one embodiment of the invention FIG. 5 is a flowchart showing one implementation of a state machine 600 included in a POI module 306, describing example steps taken during an "At POI" state. First, the POI module 306 determines whether the vessel's position is still within the POI perimeter, at step 602. If not, it accesses the time at the POI, step 604, updates the data storage system 208 with a passing event using the time at the POI, at step 606, and changes the state associated with the vessel to "Not At POI," at step 608. A passing event is designated when a vessel is detected within the boundaries of a POI's geo-fence, but the vessel does not stop long enough to record an "arrival". For example, a passing event may be recorded for a vessel as it sails past a bridge spanning a harbor in which it is moving. Thereafter, the process proceeds to step 408, of FIG. 3.

If the vessel's position is still within the POI perimeter, at step 602, the processing module 302 determines whether the vessel's speed is below a predetermined threshold, at step 610. If not, the "time stopped at the POI" is cleared and the process proceeds to step 408 of FIG. 3. Otherwise, the POI module 306 determines whether the time stopped at the POI is recorded, at step 614. If not, the data storage system 208 is updated with the time stopped at the POI and the process proceeds to step 408 of FIG. 3. Otherwise, the POI module 306 determines whether the current time minus the time stopped at the POI is greater than a predefined arrival threshold, at step 618. If so, the POI module 306 updates the data storage system 208 with an arrival event and changes the state associated with the vessel to "Arrived." Continuing with the example above of the vessel that recorded a passing event as it sailed past a bridge, the vessel may then arrive at a destination terminal or dock. The difference between the arrival event and the passing event is that in the arrival event, the vessel has stopped for a predefined threshold time period. Thereafter, or if the current time minus the time stopped at the POI is not greater than the arrival threshold, the process proceeds to step 408 of FIG. 3.

Figure 6:
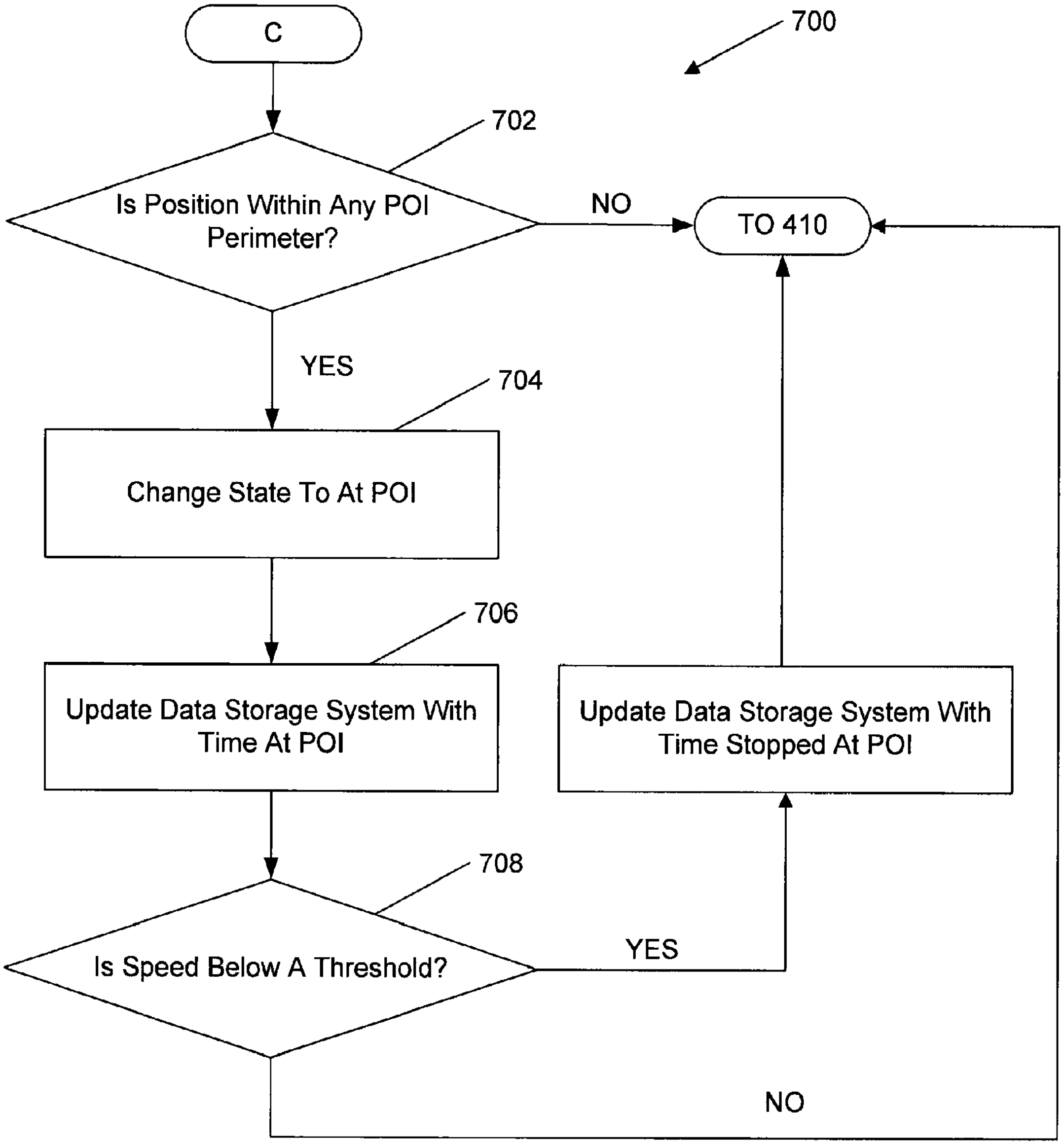
FIG. 6 is a flowchart showing one implementation of a state machine included in a point of interest module according to one embodiment of the invention.

FIG. 6 is a flowchart showing one implementation of a state machine 700 included in a POI module 306, describing example steps taken during a "Not at POI" state. While a vessel is in the "Not at POI" state of FIG. 6, the POI module 306 determines whether the vessel has entered the POI perimeter, at step 702. If not, the process returns to step 410 of FIG. 3. If so, the POI module 306 changes the state associated with the vessel to "At POI," at step 704, and updates the data storage system 208 with the time at the POI, at step 706. If the speed is determined to be below a predefined threshold, at step 708, the POI module 306 also updates the data storage system 208 with the time stopped at the POI. The predefined threshold is a constant designating a minimum vessel speed (e.g., 0.5 knots) below which the POI module 306 infers that the vessel is stopped. Thereafter, or if the vessel's speed is not below the predefined threshold, the process ends.

Figure 7:
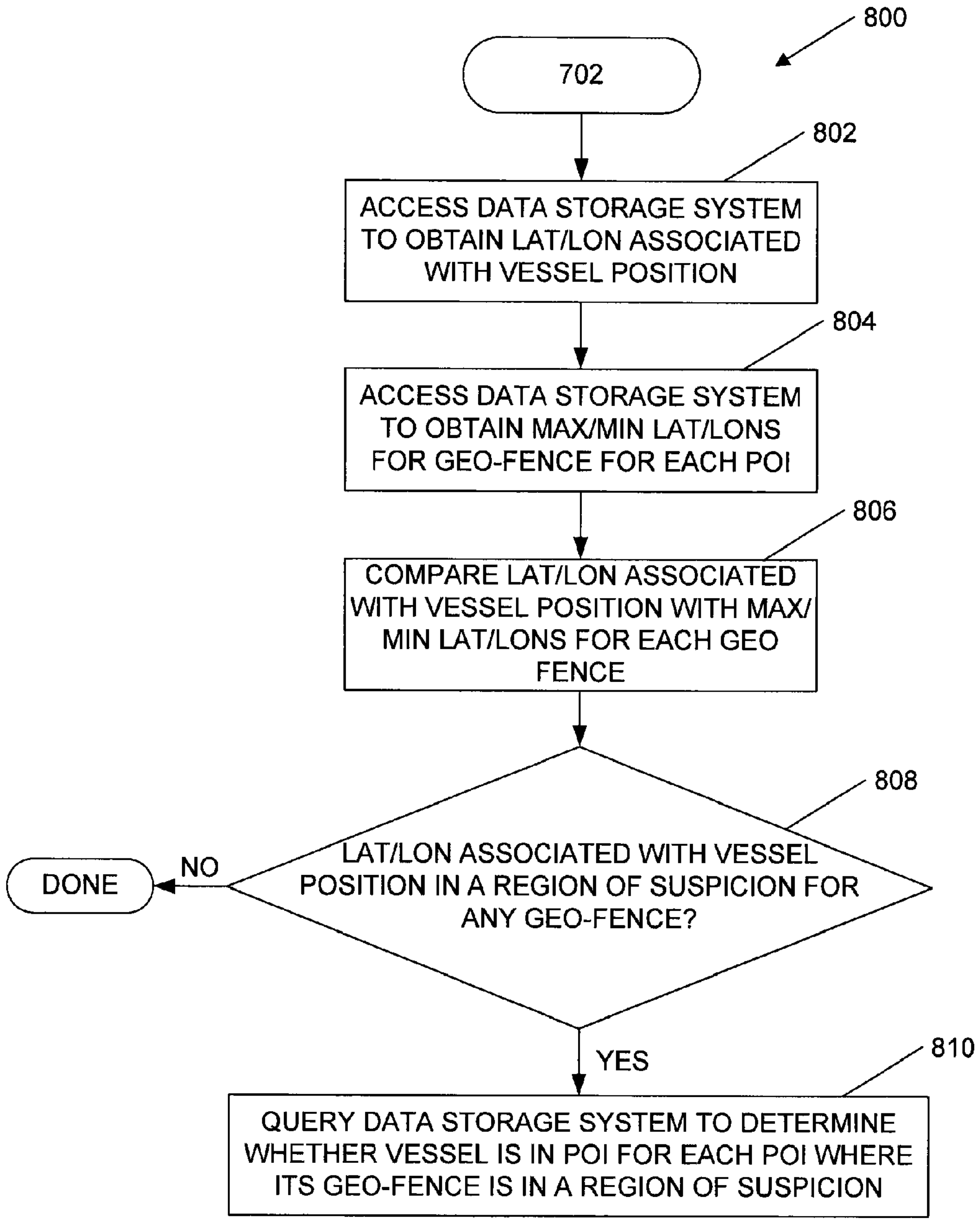
FIG. 7 is a flowchart of a process for making a determination of whether a vessel is within a POI according to one embodiment of the invention.

An example of a procedure for testing whether the vessel has entered a POI is shown in FIG. 7. In one embodiment, the data storage system 208 is configured to maintain a plurality of tables, one for each POI. In an alternative embodiment, the data storage system 208 maintains a table with a plurality of entries associated with each POI. It will be appreciated that other configurations and data structures may be used by the data storage system 208 to store data associated with a POI. When the AIS signal provides a new vessel position, the POI module 306 invokes a test, depending on the state of each vessel in the data storage system, to see if they have entered the POI.

At least one polygon defining a set of points is associated with each POI. The set of points is a geo-fence. The POI module 306 derives a maximum and a minimum latitude and longitude from the set of points making up the geo-fence. Those four latitude and longitude pairs define the smallest rectangle that contains the geo-fence. In one example, the POI module 306 stores the maximum latitude and longitude as entries in a table associated with the POI. The data storage system 208 is accessed to obtain the latitude and longitude describing the vessel's position, at step 802. At step 804, the data storage system 208 is accessed to obtain maximum and minimum latitudes and longitudes associated with a geo-fence for each POI. The POI module 306 compares the latitude and longitude associated with the vessel position with the entries in the table corresponding to the maximum and a minimum latitude and longitude value of the points in the geo-fence for each POI, at step 806.

At step 808, it is determined whether the vessel position latitude and longitude value is within a region of suspicion (e.g., its latitude is more than the minimum and less than the maximum and its longitude is more than the minimum and less than the maximum). If so, the POI module 306 further determines if the vessel has in fact entered the POI, at step 810. In this manner, the POI module 306 increases its efficiency as it narrows down the number of POIs that could potentially have been entered.

Figure 8A:
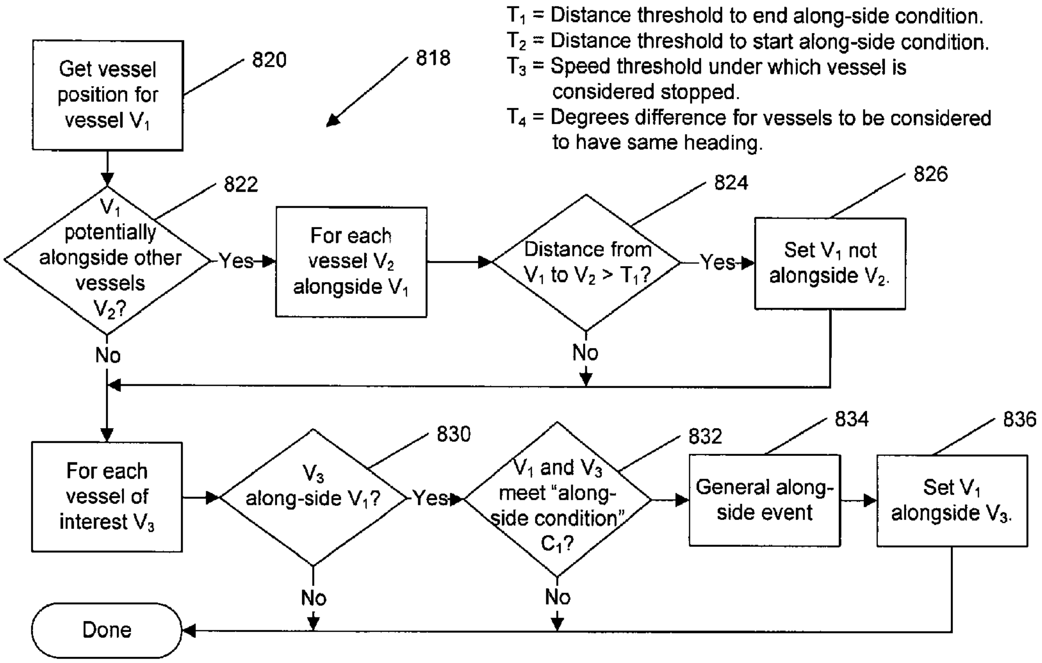
FIG. 8A is a flowchart of a process for making a determination of whether a vessel is alongside another vessel according to one embodiment of the invention.

FIG. 8A is a flowchart which describes example steps which may be taken during an "Alongside" state 410 of FIG. 3. In FIG. 8A, the POI module 306 gets a vessel position for a vessel V1, at step 820. The POI module 306 then determines whether V1 (vessel 1) is potentially alongside any other vessels at step 822. This may include determining for each vessel V2 which V1 may be alongside, whether the distance between V1 and the potential alongside vessel V2 is greater than a predefined threshold T1 at step 824. If so, V1 is determined not to be alongside the potential alongside vessel V2, at step 826.

If V1 is not alongside any vessels V2, then for each vessel of interest V3, the POI module 306 makes a determination as to whether an alongside condition is met, at step 832.

Figure 8B:
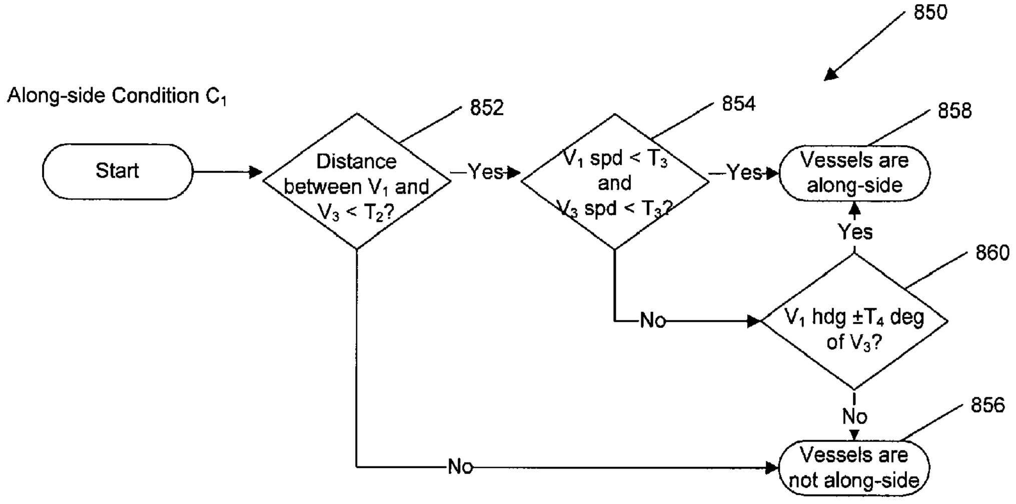
FIG. 8B is a flowchart of a process for making a determination of whether a vessel is alongside another vessel according to one embodiment of the invention.

FIG. 8B is a flowchart which describes a method of determining whether the alongside condition is met and can be used for step 832 of FIG. 8A. First, the POI module 306 makes a determination as to whether the distance between V1 and V3 is less than a threshold T2, at step 852. If not, the vessels are determined to be not alongside, at step 856. If so, the POI module 306 determines whether the speeds of V1 and V3 are less than a threshold T3, below which the vessels are considered to be stopped, at step 854. If so, the vessels are determined to be alongside, at step 858. If not, the POI module 306 determines whether the difference between the headings for V1 and V3 is less than or equal to a predetermined threshold T4, at step 860. If the difference between the headings of the vessels is close enough (i.e., less than or equal to T4), then the vessels are considered to have substantially the same heading. In that case, the vessels are determined to be alongside, at step 858. If not, the vessels are determined to be not alongside, at step 856.

Referring back to FIG. 8A, if the alongside condition 850 of FIG. 8B is met with respect to the vessels V1 and V3, at step 832, then the vessels are deemed to be alongside. The POI module 306 records a general alongside event, at step 834, and sets V1 as being alongside V3, at step 836.

Referring back to FIG. 2 the I/O module 312 allows a user to retrieve information about vessel arrivals and departures at designated POIs or information about activities occurring at the POIs from the reporting module. The I/O module can also display the last reported location for a particular vessel as well as a count of the number of vessels near a selected POI. In one embodiment, much of the information displayed to the user by the I/O module is presented graphically in the form of a map or image of an area of interest with information of interest, e.g., vessel location, represented graphically on the map or image. The I/O module can receive user input in response to which it can change the zoom level of the display, the location being displayed and the information being presented. Information such as location can be represented symbolically by an icon, such as representing vessels as triangles and POIs circles. The icons are displayed on a map corresponding to their position indicated by the data base (current position or an historic position). Colors and labels can also be used with the icons to convey additional information. In one embodiment, the user interface of the I/O module provides an historic playback of data on a map of events that occurred with respect to a vessel or a POI using the reporting module 310. For example, users can provide a start date, a start time, a vessel or POI, and a time interval via the I/O module which then displays the historic playback. In one embodiment, the user interface of the I/O module also allows for free form data entry and automatically discriminates between vessels, terminals, and other POI before providing the search information to the searching module 308.

The user interface that the I/O module 312 generates can include a number of features. In one example, the user interface is implemented on a website. Users can log in to the website and enter vessel or POI related data to identify one or more vessels or ports. The I/O module 312 in conjunction with the processing module 302 processes the vessel related data to map the vessels that the user has identified. In one embodiment, the user interface includes an event window. As the state machine in the POI module 306 determines when events occur with regard to the vessel and the data storage system 208 is updated with the events, the event window can display the events for the user to view.

The event window can have a vessel centric view as described above, and it may also have a POI centric view. For example, the user can select a POI. In the POI centric view, the event window switches to the selected POI and the event window displays the events that the state machine has logged to the data storage system with regard to the selected POI. The user interface also can display vectors associated with each vessel to indicate to the user the speed and direction of the vessel.

Users who wish to monitor a plurality of vessels, or even entire fleets of vessels, can use the user interface such that the user interface allows the user to enter data regarding each vessel in the fleet. Thereafter, the user interface can associate a visual identifier with each vessel in the fleet for ease of use for the user. In one example, the user interface can display each vessel in the fleet in a selected color. The plurality of vessels may also be displayed by the I/O module individually color-coded according to various vessel categories, features, and data selected by the user via the user interface.

The user interface of the I/O module also allows authorized administrators to enter data for terminals or other POI. The authorized administrator can enter data into a notes section and the notes can be made available to all users. For example, the authorized administrator may enter "dredging at dock 2" into the notes section, thereby alerting other users to the condition.

In one embodiment, the processing module 302 continually receives AIS signals from vessels. If there are multiple reception systems 202 installed in various locations, however, there may be an overlap of received AIS signals. That is, for example, two different receivers 210A and 210D (shown in FIG. 1) may receive the same AIS signal from the same vessel. Both receivers may then transmit the AIS signal to an analysis system 212 for harvesting business intelligence from maritime communications. As a result, the analysis system 212 receives the same AIS signal two times, once from each receiver 210A and 210D.

Figure 9:
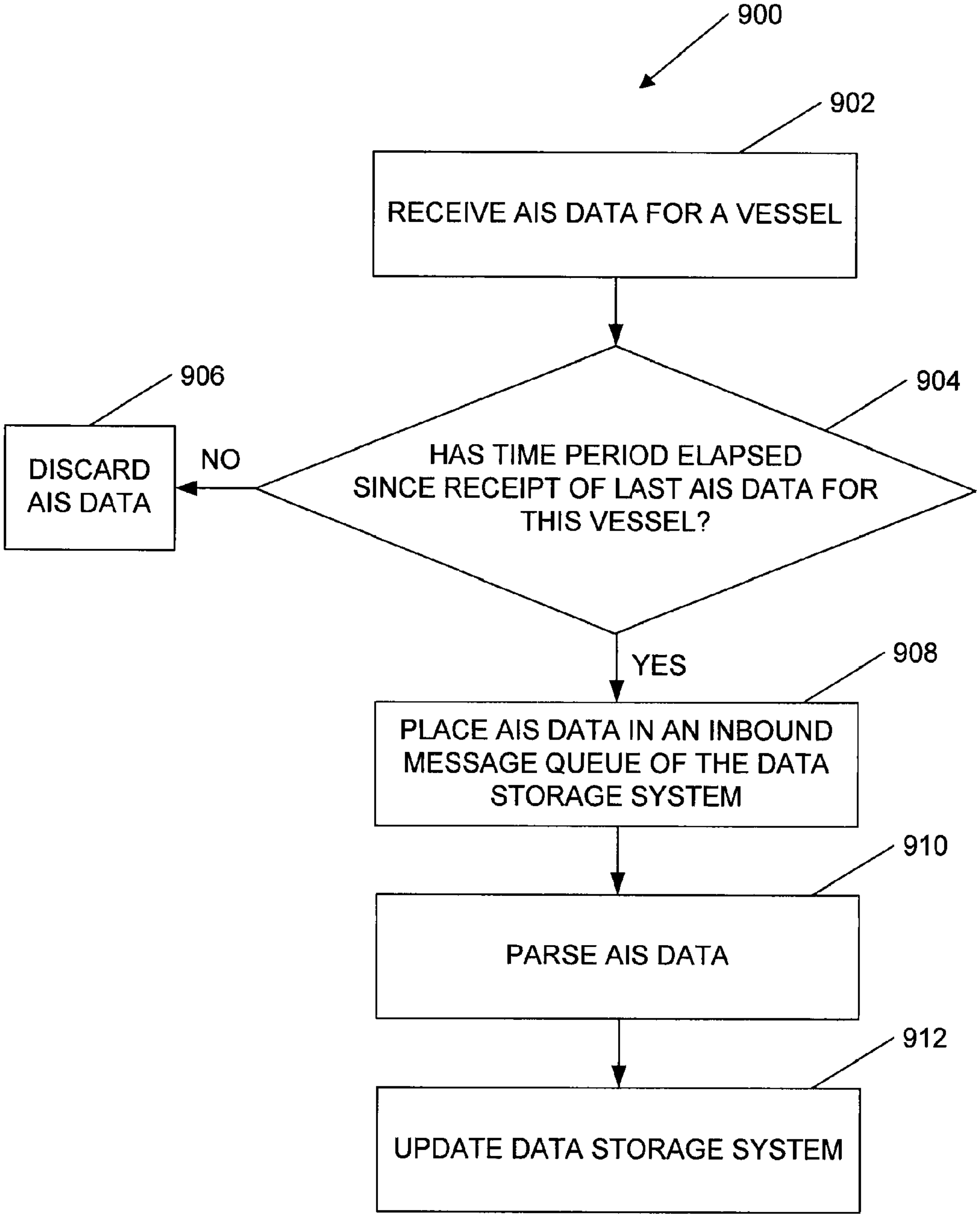
FIG. 9 is a flowchart of a method for processing received AIS signals according to one embodiment of the invention.

To eliminate redundant signals, the processing module 302 filters out certain AIS signals as shown in FIG. 9. The processing module 302 receives more than one AIS signal from a particular vessel, at step 902. It is determined whether the later-received AIS signals were received during a predefined time period (e.g., 1 minute, 20 seconds, 2 minutes, etc.), at step 904. If so, the later-received signals are discarded at step 906. Alternatively, the earlier received signal can be discarded. The predefined time period can vary depending on the type of vessel or the location.

If a later-received AIS signal was not received within the predefined time period, the processing module 302 processes the signal, including, for example, converting the signal, storing the signal in the inbound message queue, at step 908, parsing the signal from the queue, at step 910, and storing the parsed signal in the data storage system 208, at step 912. In one embodiment, the processing module 302 can also implement a locking process on the data storage system 208 to ensure that a race condition does not occur in the case where two signals from different AIS transmitters arrive essentially simultaneously.

Figure 10:
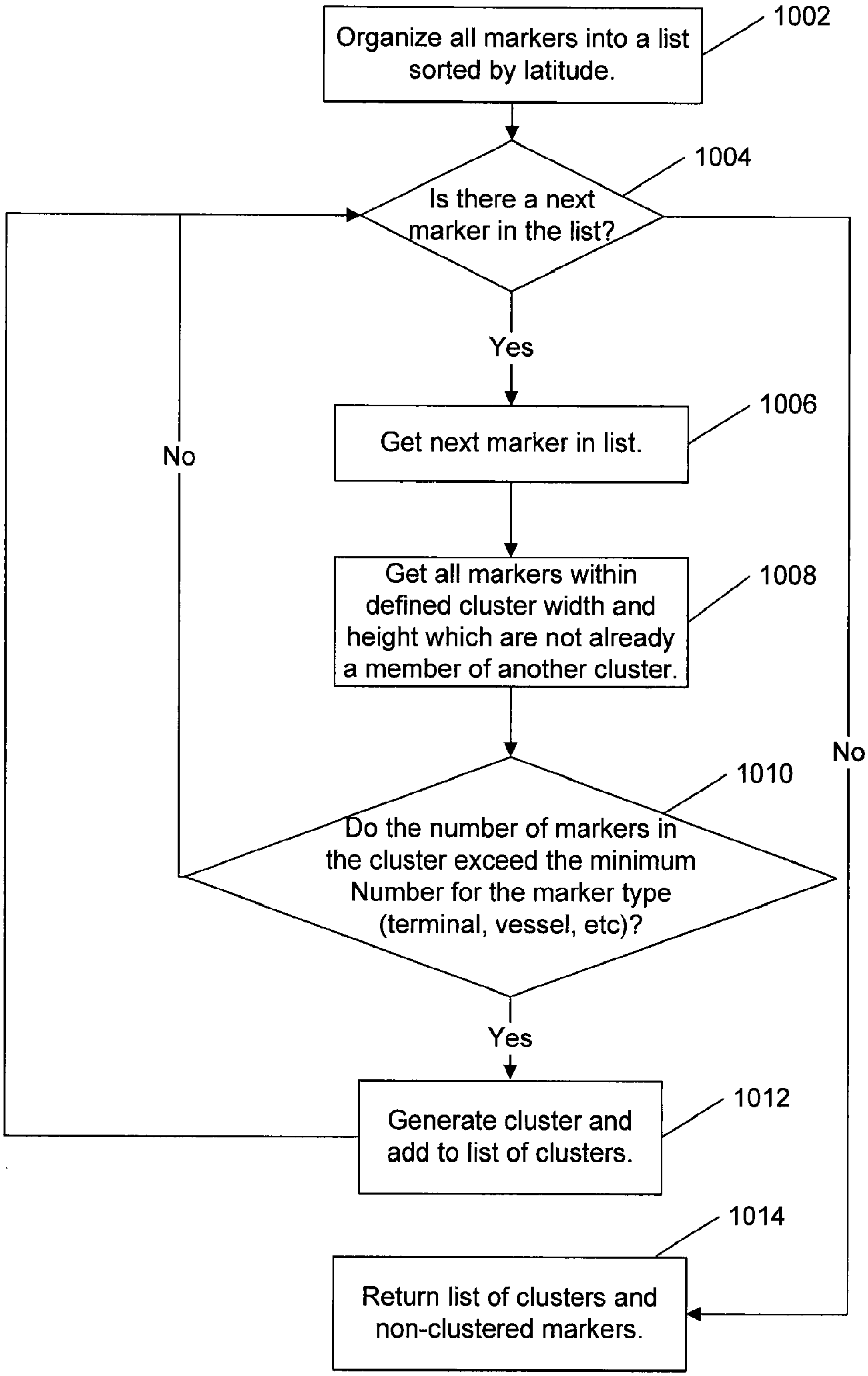
FIG. 10 is a flowchart of a process for map target clustering according to one embodiment of the invention.

FIG. 10 is a flowchart of a process for map target clustering which can be carried out by the I/O module 312 according to one embodiment of the invention. The process represented in FIG. 10 is carried out by the I/O module 312 to analyze a set of icons, for example, the icons for vessels and the icons for terminals, prior to graphically displaying that information. In certain circumstances groups of icons can be replaced with a single icon which represents a cluster of icons. The information from the database system 208 which is going to be presented superimposed on a map or image of a geographic area selected by the user is generally referred to as markers. Markers includes, for example, the icons which represent vessels, terminals and POIs.

Beginning at a step 1002, the module organizes all of the markers to be displayed in the selected geographic area into a list sorted by latitude. At a step 1004, the module determines whether there is a next marker in the list to be processed. If there is, the module then begins processing that marker as represented by step 1006. At a step 1008, all markers with locations within a defined cluster area (defined, for example by a width and height or a radius) are added to the cluster associated with the marker being processed. The size of the cluster area changes relative to the size of the geographic area to be displayed. Markers which are already a member of another cluster are excluded as represented by step 1008. As represented by step 1010, the module next determines whether the number of markers in the cluster exceeds the predetermined minimum number for that type of marker (terminal, vessel, etc.). If the number of markers in the cluster being created does not exceed the minimum number for the marker type, the process proceeds to step 1004. If the minimum is exceeded at a step 1011, a cluster is generated (defined) and that cluster and its definition (list of markers which belongs to the cluster) is stored. The process then returns to step 1004. At step 1004, when the module determines if there are no more markers to be processed, the method continues on to step 1014, where the list of clusters and markers that do not belong to clusters for the geographic area of interest (to be displayed) is used to generate the display for a user. Each determined cluster is represented in the display by an icon which represents a cluster of icons.

Figure 11:
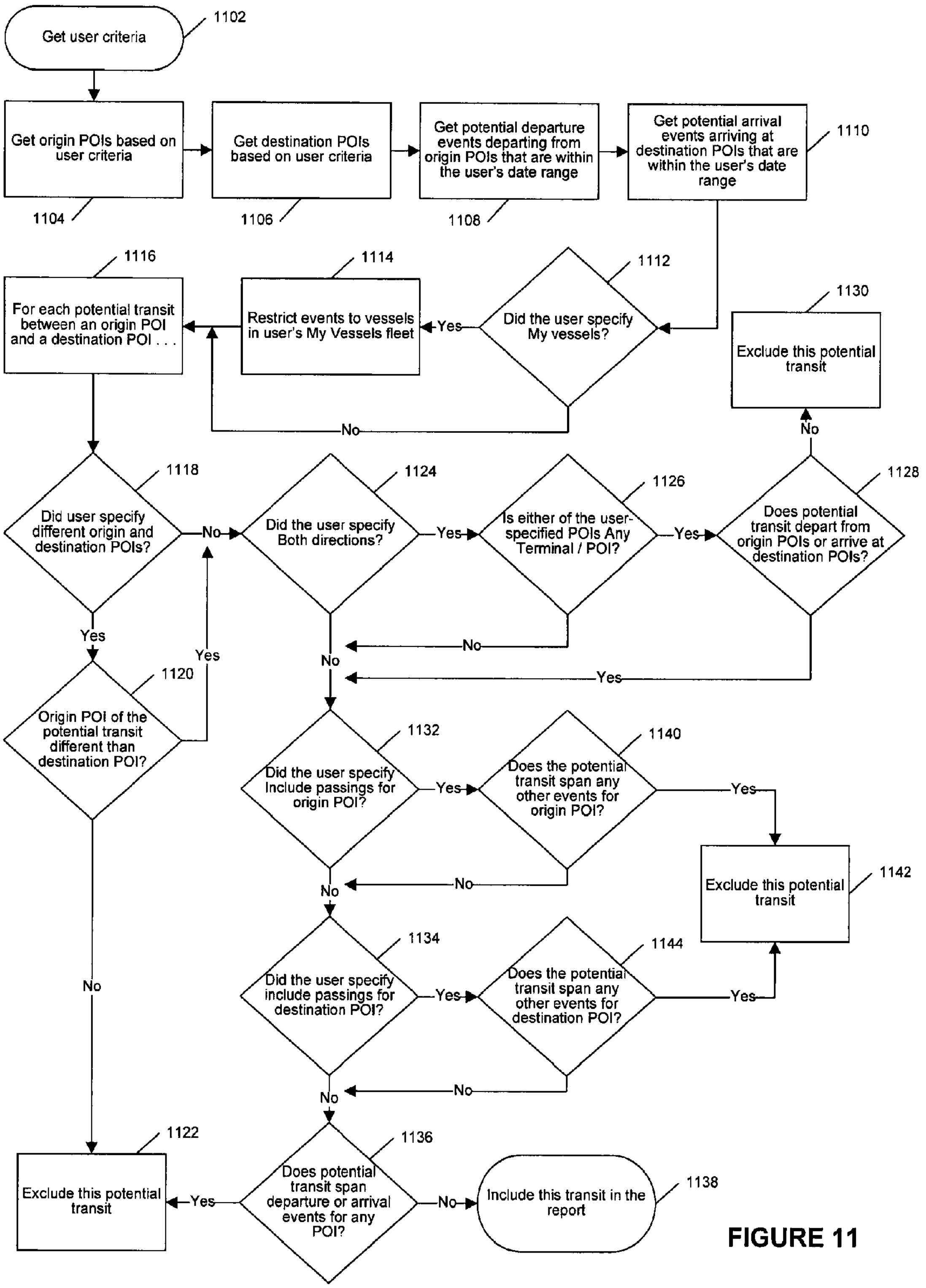
FIG. 11 is a flowchart of a process for deriving information relating to transits between two points of interest.

FIG. 11 is a flowchart for a process for deriving information relating to transits between two POIs. In one embodiment, this process is carried out by the I/O module 312. In one embodiment, this process is carried out in response to a request from a user for information (e.g., generate a report) relating to vessel transits between user-selected POIs. The information can include a listing of the transits and information regarding those transits, for example, departure time, arrival time and total transit time.

As represented by step 1102, the module first receives user-selected criteria. The module can obtain that information, for example, by receiving user input. At a step 1104, the module identifies the origin POI(s) from the user criteria. At a step 1106, the module identifies the destination POI(s) from the user criteria. The module then obtains potential departure events associated with the origin POI(s) that are within the user's data range (e.g., time and date ranges, day or night) from the historical data 319. At a step 1110, the module obtains potential arrival events arriving at the destination POI(s) that are within the user's data range. At a step 1112, the module determines whether the user has specified a limited list of vessels of interest. For example, users can have preexisting list of vessels (e.g., my vessels). If the user has specified such a limited list of vessels at a step 1114, information relating to other vessels is removed from consideration.

If no such restriction has been made, the method continues on to step 1116. Step 1116 represents the beginning of the process that is followed for each potential transit between an origin POI and a destination POI. At step 1118 the module first determines whether the user specified different origin and destination POIs. If the user did, at a step 1120, the module determines whether the origin POI of the potential transit is different than the destination POI of the potential transit. If that is not the case, then the transit being processed is excluded as represented by step 1122. If at step 1120 it is determined by the module that the origin POI of the potential transit is different than the destination POI, the method continues on to step 1124. If the user specified both directions of transit, the process continues to step 1126.

At step 1126, the module determines whether any of the POIs specified by the user was specified as being any terminal or POI. This could be used by a user to identify any transits arriving or departing from a selected POI. If the user selected one of the POIs as being any POI, the method continues on to step 1128, where the module determines whether the transit being analyzed includes a departure from one of the user-selected origin POIs or arrivals at one of the user-selected destination POIs. If that is not the case, this transit is excluded from the potential list as represented by step 1130.

If the user did not specify both directions (step 1124) or neither of the user-specified POIs was any POI (step 1126) or the transit being analyzed departed from one of the selected origin POIs or arrived at one of the destination POIs (1128), the process continues on to step 1132. At step 1132 the module determines whether the user specified to include passings of the origin POI as a transit of interest. In one embodiment, a passing is a departure event which is intended to identify a vessel being within a certain proximity to a POI but not arriving at that POI. If passings were not specified for the origin POI the process proceeds to step 1134. At step 1134 the module determines whether the user specified passings for the destination POI. If the user did not designate passings for a destination POI, the module proceeds to step 1136. At step 1136 the module determines whether the potential transit spans departure or arrival events for any other POI besides the origin POI and the destination POI. If the transit does span such events, a potential transit is excluded from the list as represented by step 1122. If the transit does not span any such events, it is included in the report as represented by step 1138.

Returning to step 1132, if the user did include passings for the origin POI, the method proceeds to step 1140 where the module determines whether the potential transit spans any other events for the origin POI. If it does not, the potential transit is excluded as represented by step 1142.

Referring back to step 1134, if the user specify included passings for the destination POI, the method then proceeds to step 1144. At step 1144 the module determines whether the potential transit spans any other events for the destination POI. If it does, this transit is excluded as represented by step 1142. If it does not, the method proceeds to step 1136.

Those of skill will appreciate that the various illustrative logical blocks, modules, state machines, and algorithm steps described in connection with the embodiments disclosed herein can often be implemented as electronic hardware, computer software, or combinations of both. To clearly illustrate this interchangeability of hardware and software, various illustrative components, blocks, modules, state machines, and steps have been described above generally in terms of their functionality. Whether such functionality is implemented as hardware or software depends upon the system for harvesting business intelligence from maritime communications and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computerized system for creating a historical record of the location of maritime vessels and their geographic relationships over time and for harvesting business intelligence from the created historical record, the system comprising:

a data storage system which stores real time data and historical data regarding the location of vessels and their geographic relationships over time;

a reception system including one or more land located receivers for receiving automated identification system (AIS) from a plurality of vessels;

a processing module, which receives the automated identification system (AIS) signals from the reception system;

an inbound message queue, which receives the AIS signals from the processing module and stores them in the data storage system;

a parsing module, which processes the AIS signal to divide each AIS signal into a plurality of AIS component data including vessel identifying information and location information and stores them in the data storage system; and a points of interest (POI) module, which stores data defining points of interest in the data storage system and includes a state machine, which derives arrival and departure events of a vessel relative to points of interest using the data defining the points of interest and the AIS component data and updates the data storage system with the derived arrival and departure events;

wherein data regarding vessels from which AIS signals have been received and points of interest for which arrival and departure have been derived is accumulated in the data storage system over time to form a historical record.

2. The computerized system of claim 1 further comprising an input/output module configured to receive input from a user and to access the data storage system and display output to the user based on data in the data storage system and the input.

3. The computerized system of claim 2 further comprising a searching module configured to perform searches of the historical record in the data storage system.

4. The computerized system of claim 3 wherein the searching module is further configured to analyze current data in the data storage system to determine vessels within a defined distance from a selected POI.

5. The computerized system of claim 1 wherein the data associated with the point of interest includes a name and a location.

6. The computerized system of claim 1 wherein the state machine determines when a vessel departs from a point of interest, when a vessel passes a point of interest and when a vessel arrives at a point of interest.

7. The computerized system of claim 6 further comprising a day / night conversion module configured to determine whether an arrival or a departure occurred during the day or during the night.

8. The computerized system of claim 1 further comprising a reporting module configured to generate a report based on the historical record in the data storage system.

9. A method for operating a computerized system for creating a historical record of the location of vessels and their geographic relationships over time from maritime communications and harvesting business intelligence from the historical record of the location of vessels and their geographic relationships, the method comprising:

receiving signals from a plurality of vessels which include vessel identifying information and location information;

parsing the received signals to determine vessel identifying information and vessel location information and storing the vessel identifying information and the location information in a data storage system;

deriving event information about vessels and points of interest (POI) using the vessel identifying information and vessel location information and data defining points of interest;

storing the derived event information in the data storage system, the derived event information, the vessel identifying information and the location information are accumulated in the data storage system over time to form a historical record regarding the location of vessels and their geographic relationships over time in the data storage system; and searching the historical record in response to a user request and generating a report.

10. The method of claim 9 wherein deriving event information comprises determining whether a vessel has entered a perimeter associated with a POI and if so, updating the data storage system to indicate that the vessel has arrived at the POI.

11. The method of claim 10 further comprising after it has been determined that the vessel has entered the perimeter associated with the POI, determining whether the speed of the vessel is below a threshold and if it is, updating the data storage system with the time the vessel stopped at the POI.

12. The method of claim 9 wherein deriving event information further comprises comparing the current position of a vessel to a defined geographic area associated with a POI at which the vessel previously arrived; and if the vessel is no longer within the defined geographic area associated with the POI, updating the data storage system to reflect a departure from the POI.

13. The method of claim 9 further comprising generating a report relating to a selected POI.

14. The method of claim 9 wherein a vessel is a POI.

15. A method for operating a computerized system for harvesting business intelligence from maritime communications and creating a historical record of the location of vessels and their geographic relationships over time, the method comprising:

receiving first signals from a plurality of vessels which include vessel identifying information and location information;

storing the location information in a data storage system with each location information associated with a vessel;

deriving arrival and departure information from the geographic relationship between vessels and points of interest using the vessel location information and data defining points of interest (POI);

storing the derived arrival and departure information in the data storage system;

receiving second signals from the plurality of vessels which include vessel identifying information and location information;

storing the location information from the second signals in the data storage system with each location information associated with a vessel;

deriving arrival and departure information from the geographic relationship between vessels and points of interest using the vessel location information from the second signals and data defining points of interest; and storing the derived arrival and departure information in the data storage system;

wherein the derived arrival and departure information, the vessel identifying information and the location information are accumulated in the data storage system over time to form a historical record regarding the location of vessels and their geographic relationships over time in the data storage system.

16. The method of claim 15 wherein a vessel is a POI.

17. The method of claim 15 wherein deriving arrival and departure information comprises determining whether a vessel has entered a pre-defined perimeter associated with a POI and if so, updating the data storage system to indicate that the vessel has arrived at the POI.

18. The method of claim 17 further comprising after it has been determined that the vessel has entered the perimeter associated with the POI, determining whether the speed of the vessel is below a threshold and if it is, updating the data storage system with the time the vessel stopped at the POI.

19. The method of claim 17 wherein deriving arrival and departure information further comprises comparing the current position of a vessel to the perimeter associated with a POI at which the vessel previously arrived; and if the vessel is no longer within the perimeter, updating the data storage system to reflect a departure from the POI.

20. The method of claim 15 further comprising searching the historical record in response to a user request and generating a report of arrivals and departures relating to a selected POI.

* * * * *